No. 648,540. Patented May 1, 1900.
F. THACHER.
SCRAPER.
(Application filed July 20, 1899.)
(No Model.)
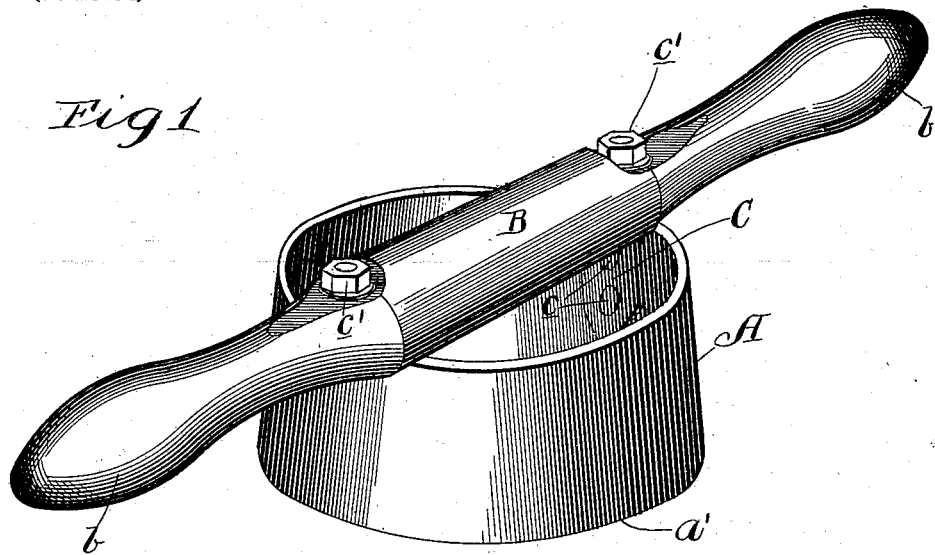
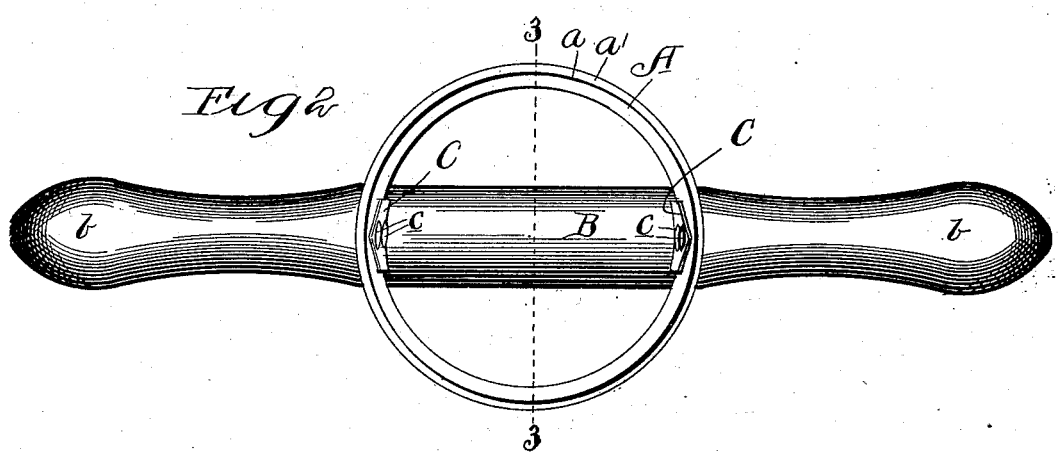
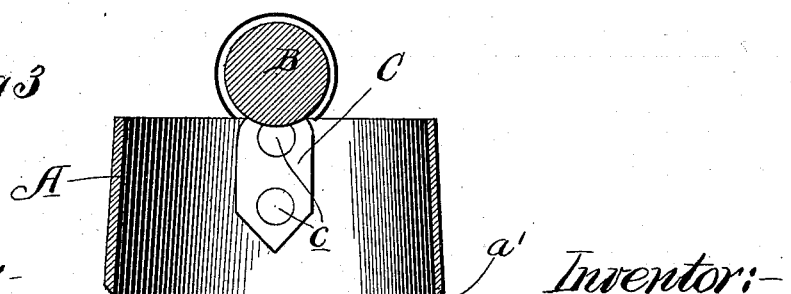
Witnesses:
C. H. Crawford
William H. Hall
Inventor:
Francis Thacher
by Poole & Brown
his Attys

UNITED STATES PATENT OFFICE.

FRANCIS THACHER, OF CHICAGO, ILLINOIS.

SCRAPER.

SPECIFICATION forming part of Letters Patent No. 648,540, dated May 1, 1900.

Application filed July 20, 1899. Serial No. 724,462. (No model.)

*To all whom it may concern:*

Be it known that I, FRANCIS THACHER, of Chicago, in the county of Cook and State of Illinois, have invented certain new and useful Improvements in Scrapers; and I do hereby declare that the following is a full, clear, and exact description thereof, reference being had to the accompanying drawings, and to the letters of reference marked thereon, which form a part of this specification.

This invention relates to a novel device for scraping flat surfaces for the purpose of smoothing or truing the same.

The invention is more especially designed for the use of butchers in scraping meat-blocks, but is also adapted for other uses where it may be desired to provide means for scraping flat surfaces.

The invention consists in the matters hereinafter set forth and more particularly pointed out in the appended claims.

In the drawings, Figure 1 is a perspective view of a scraper made in accordance with my invention. Fig. 2 is a bottom plan view thereof, and Fig. 3 is a cross-section of the device, taken on line 3 3 of Fig. 2.

As shown in said drawings, A designates the blade of the scraper, and B designates a handle-bar, which is attached to the upper margin of the blade and is provided with handles or hand-grips $b$ $b$, which extend outside of the blade and afford means by which the device may be grasped by the hands when in use.

The blade A is of novel form, the same being generally circular in form and provided at its lower margin with a circular scraping edge $a$. Said scraping edge is located in line with the interior surface of the blade and is formed by beveling the outer surface of the blade, near the lower edge thereof, at an angle to the inner and outer surface of the blade. As herein shown, the beveled surface $a'$ is disposed at an angle of substantially forty-five degrees to said inner and outer surfaces of the blade; but such angle may be varied, as found most effective for the purpose intended. Said annular blade is preferably made of flaring form and of greater diameter at the lower end than the upper end thereof. A convenient manner of making said annular blade consists in cutting from a steel tube a section of sufficient length to give the required depth to the blade and afterward expanding the lower end thereof over a conical mandrel to give the desired flaring shape to the walls of the blade. The lower margin of the blade is afterward beveled, as indicated at $a'$, to provide the sharp scraping edge at the inner side of the said lower margin of the blade.

The handle-bar B is herein shown as connected with the annular blade by means of two lugs C, which are attached to the interior face of the blade, on opposite sides of the center thereof, by means of rivets $c$ or the like and project upwardly beyond the upper margin of said blade. The upper ends of said lugs extend through apertures in the handle-bar B and are provided above said bar with screw-threaded portions which are engaged by nuts $c'$.

When the device is to be used, the handle $b$ will be grasped by the operator and the blade pressed firmly against the surface to be scraped and moved in contact with said surface toward the operator, or it may be moved in the same manner from the operator, or it may be moved sidewise, or in any other direction. The scraping edge $a$ of the blade preferably being made sharp throughout the entire circumference thereof, said device will operate effectively when moved in any direction. The effective or scraping portion of the blade at any particular time when in use is the rear portion thereof with respect to the direction of movement of the device. As before stated, the preferred form of the annular blade is one in which the walls are made flaring, and with this construction the effective portion of the blade is inclined at the upper end forwardly or toward the direction of movement of the device, it being found that a scraper operates more effectively if maintained in such forward inclination during the operation of scraping. Such inclination of the inner surface of the blade might be obtained with a cylindric blade by beveling the inner surface thereof adjacent to its scraping edge, yet an advantage is obtained by making the entire blade of conical form, for the reason that when so constructed the scraping edge may be sharpened by filing or grinding the outer or beveled surface of the blade only, and even if a considerable part of the blade be removed in so sharpening it the inclination of the inner surface thereof adjacent to the scraping edge will always remain the same.

The principal advantage of making the blade A in annular form, as herein shown, is that such form prevents the blade from digging into the surface which is being scraped, thereby producing an uneven surface. This result is due to the fact that, the scraping edge of the blade being continuous and being held in contact with the surface being scraped, the blade is maintained at all times parallel with said surface, and therefore has no tendency to cut more deeply into the surface at one place than another. In other words, the part of the blade which is located in front of the effective portion thereof with reference to the direction of movement of the device serves to hold said effective portion of the blade at the general level of the surface which is being scraped and prevents the same from tipping or tilting, and thereby cutting into the surface unequally or unevenly.

While a blade made of circular form, as described, and sharpened by being beveled at both its inner and outer surfaces would be effective for the purpose and would tend to maintain the scraped surface flat or level by reason of the scraping edge of the blade being kept at all times parallel with the surface being scraped, yet such form of blade would be less desirable than that herein shown, for the reason that if all parts of the blade were adapted to afford an equal scraping action in moving in either direction that part of the edge in advance of the center of the blade would by reason of the resistance coming on the half of the blade in advance of the handle tend by retarding the same to turn or rotate the implement in the hand. The blade when beveled and adapted to act only in its part which is at the rear of the center of the blade, (referring to its direction of motion of the implement when scraping,) as described, operates smoothly and evenly and will produce and maintain a flat surface without special care on the part of the operator. It is to be especially noted that with handles arranged as described when the scraper is drawn toward or pushed from the operator it will naturally bear equally against the surface at both sides of the handles and excessive pressure on the scraper at the front or rear of the handle in a way to scrape too deeply into the wood is not only unlikely to occur, but would be difficult to accomplish.

The provision of the beveled surface $a'$ at the lower margin of the blade enables the same to be easily kept sharpened and also renders the action of the blade more effective than if both sides of the blade were beveled to produce the scraping edge.

It will be obvious that the blade need not constitute a complete circle and that it need not always have the form of a true circle. Such modifications, therefore, as will produce the results above set forth are to be included within the scope of the claims.

I claim as my invention—

1. A scraper, comprising an annular blade which is made of greater diameter at its lower than at its upper end and is beveled on its external surface adjacent to its lower margin to provide a scraping edge in line with the interior surface of the blade.

2. A scraper, comprising an annular blade provided at its lower margin with a scraping edge, and a handle-bar attached to the upper margin of the blade and projecting beyond said blade at either side thereof to form handles.

In testimony that I claim the foregoing as my invention I affix my signature, in presence of two witnesses, this 17th day of July, A. D. 1899.

FRANCIS THACHER.

Witnesses:
C. CLARENCE POOLE,
C. W. HILLS.